(No Model.)　　　　　　　　　　　　　　　　　　2 Sheets—Sheet 1.
G. W. ANDERSON.
SPEED GOVERNOR.

No. 310,167.　　　　　　　　　Patented Jan. 6, 1885.

ATTEST:
J. Henry Kaiser.
Geo. T. Smallwood.

INVENTOR.
Geo. W. Anderson.

(No Model.) 2 Sheets—Sheet 2.

G. W. ANDERSON.
SPEED GOVERNOR.

No. 310,167. Patented Jan. 6, 1885.

ATTEST.
J. Henry Kaiser
Geo. T. Smallwood

INVENTOR.
Geo W Anderson
By H A Seymour

UNITED STATES PATENT OFFICE.

GEORGE W. ANDERSON, OF WESTPORT, INDIANA.

SPEED-GOVERNOR.

SPECIFICATION forming part of Letters Patent No. 310,167, dated January 6, 1885.

Application filed April 4, 1884. (No model.)

*To all whom it may concern:*

Be it known that I, GEORGE W. ANDERSON, of Westport, in the county of Decatur and State of Indiana, have invented certain new and useful Improvements in Speed-Governors; and I do hereby declare the following to be a full, clear, and exact description of the invention, such as will enable others skilled in the art to which it appertains to make and use the same.

My invention relates to an improvement in speed-governors, the object of the same being to provide mechanism whereby a regular rate of speed under varying loads and different pressures of water or steam may be obtained with slight variation and load of the governor.

With these ends in view my invention consists in certain features of construction and combinations of parts, as will be hereinafter fully described, and pointed out in the claims.

Figure 1:
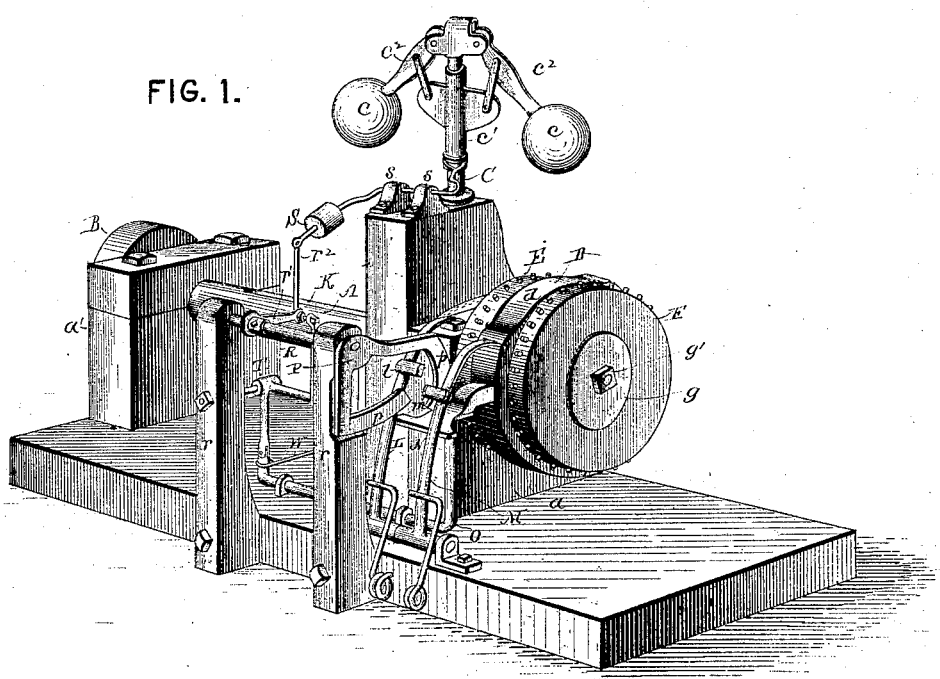
Figure 2:
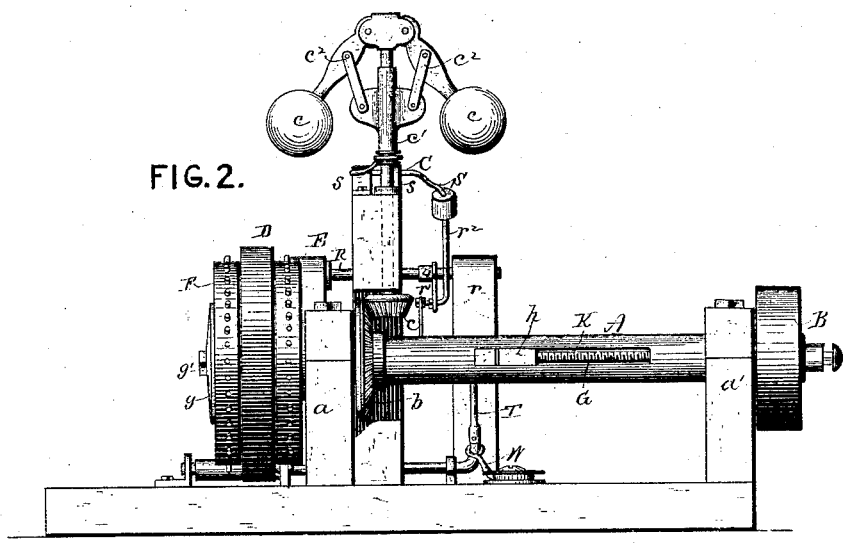
Figure 3:
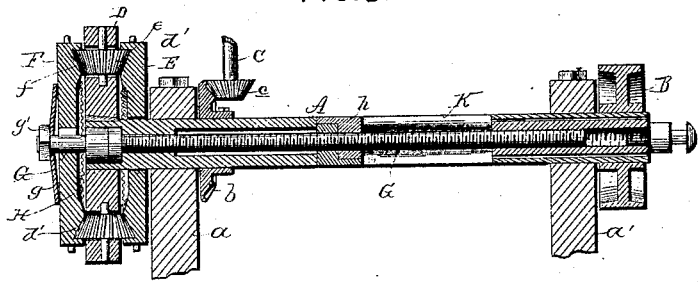
Figure 5:
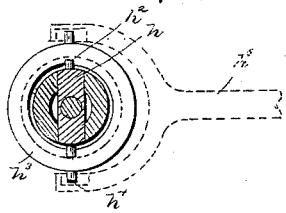
Figure 6:
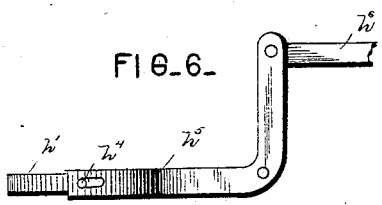
Figure 4:
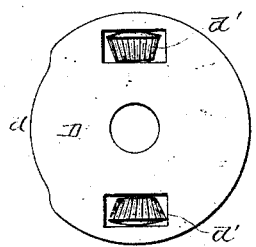

In the accompanying drawings, Figure 1 is a view of the mechanism in perspective. Fig. 2 is a view in front elevation. Fig. 3 is a longitudinal sectional view through the shaft.
Fig. 4 is a detached view of the cam-wheel, and Figs. 5 and 6 are views showing one manner of connecting the sliding nut and valve.

A represents a hollow shaft, journaled in suitable bearings, $a$ and $a'$, and provided with a pulley, B, or other convenient device, whereby a rotary motion may be communicated to the shaft from the piston by any approved intervening mechanism. The shaft A is further provided with a bevel gear-wheel, $b$, which engages a bevel gear-pinion on the governor-shaft C, causing the same to rotate with the shaft A. The governor proper is of the ordinary construction, consisting of two balls, $c$, situated diametrically opposite, hinged to the upper portion of the shaft C in such a manner as to allow a vertical movement only, which vertical movement is communicated to a sleeve, $c'$, adapted to slide on the shaft C by connecting-rods $c^2$. The shaft A is further provided with a cam-wheel or flange, D, rigidly secured thereon. The wheel D has a smooth circular rim extending about three-fourths of the distance around, the remaining fourth being cut away, as shown at $d$. The wheel D is provided with two radial pinions, $d'$, mounted loosely on axles rigidly secured to the wheel D, and situated between the shaft A and periphery of said wheel. The pinions $d'$ are provided with bevel-gear on their rims, which meshes with similar gear on the faces of the wheels E and F. The wheel E is loosely mounted on the shaft A, in close proximity to the wheel D, is preferably somewhat less in circumference than the wheel D, and is provided with teeth or spurs on its periphery and with the annular bevel-gear $e$, already referred to. The wheel F is secured on a central rod or shaft, G, which passes longitudinally through the hollow shaft A, and extends a convenient distance beyond one or both ends of said hollow shaft. The wheel F is held against rotary motion on the central shaft, G, by feather and groove or other suitable devices, and is preferably of the same dimensions as the wheel E, and provided with teeth or spurs on its periphery, and an annular bevel-gear, $f$, which latter is held in contact with the radial pinions $d'$ by a spring-washer, $g$, and nut $g'$ on the end of the central shaft, G. The rod or shaft G is held against longitudinal motion in the shaft A by a flange or collar, H, which engages an annular groove in the said shaft A. The shaft G is threaded for a distance sufficient to allow the necessary motion of a nut, $h$, with which it is provided, and which is caused to rotate with the shaft A by passing outwardly through diametrically opposed elongated slots K in the shaft A. The shaft G is further provided with a nut or threaded sleeve, $k$, on its end, which is caused to rotate with the shaft A by devices connecting it with said shaft, which will allow it at the same time to move longitudinally, the object of this construction of the nut $h$ and threaded sleeve $k$ being to cause the said nut and sleeve to move longitudinally along the shaft G when the shaft A is rotated, and shaft G held against rotation or caused to rotate faster than A. Two spring-pressed dogs, L and M, are situated in positions to engage the teeth on the peripheries of the wheels E and F respectively, and are alternately prevented from and allowed to engage the said wheels by a T-shaped guide, N, which is secured to the end of a crank-arm of the rock-shaft O, the standard of said guide being adapted to rest against the rim of the cam-wheel D, while the dogs L and M rest against the cross-bar of the guide. When, however, the guide N reaches the cut-away portion of the rim of the wheel D, it allows the dogs to move forward sufficiently to engage the teeth on the wheels E and F; but the dogs L and M are not both allowed to engage the wheels E and F at the same time, and mechanism for determining which shall and which shall not so engage the wheel is constructed as follows: A sector, P, consisting of two curved arms, $p$ and $p'$, is rigidly secured on the end of a rock-shaft, R, the latter being journaled in suitable bearings, $r$, conveniently near the shaft A. The ends of the arms $p$ $p'$ are bent out of the same plane, and are situated in a position to engage the pins or projections $l$ and $m$ on the dogs L and M, respectively, and hold the dogs against engaging the wheels E and F. The arms $p$ $p'$ do not, however, touch the projections $l$ and $m$ when the guide N is in contact with the regular portion of the rim of the wheel D. The rock-shaft R is further provided with an arm, $r'$, extending conveniently toward the governor-shaft C. The end of the arm $r'$ is connected with end of a lever, S, by the rod $r^2$, the other end of the lever S being connected to the sliding sleeve on the shaft C of the governor. The lever S is journaled in suitable bearings, $s$, attached to the governor-support.

The operation of the above-described mechanism is as follows: The shaft A is caused to rotate by its connection with the piston of the engine or shaft of the water-wheel either directly or indirectly, as found convenient. This causes the cam-wheel D to rotate, and each revolution brings the cut-away portion in contact with the guide N, and leaves the dogs L and M free to engage the teeth on the wheels E and F, respectively. We will suppose the dogs L and M to be held from contact with the wheels E and F by the ends of the arms $p$ and $p'$. The connections between the governor proper and the rock-shaft R are so regulated that the dogs shall be held in this position when the speed is uniform and at the required rate. If, now, the speed falls below this rate, the slide on the governor-shaft will fall, thereby depressing the end of the lever S and causing the rock-shaft R to slightly revolve and release the dog L, which, when the guide N reaches the cut-away portion of the wheel D, allows the dog L to engage the wheel E, and thus prevent the shaft G from rotating with the shaft A. The nut $h$ and sleeve $k$ will thus be caused to move longitudinally along the shaft A by the thread on the shaft G, and by means of suitable devices connecting either the sleeve $k$ or nut $h$ with the valves will supply more steam. One manner of connecting the valve and nut is as follows: The nut $h$ can be provided with pins $h^2$, which latter are adapted to move freely in the annual groove in the collar $h^3$. This collar is provided with pins $h^4$, which latter are journaled in bearings in the bifurcated end of the bell-crank lever $h^5$. This lever is pivoted to a post, and is connected at its free end to the valve-rod $h^6$. Thus it will be seen that as the nut $h$ is moved the bell-crank lever is also moved and operates the valve-stem.

Instead of employing the nut, the bell-crank lever can be connected to the cap $k'$ of the sleeve $k$ and operates the valves.

Numerous other devices can be devised for connecting the valve with the nut or sleeve, and hence I do not limit myself to any particular arrangement of parts for accomplishing that end. When the speed is too high, the rock-shaft R will be rotated in the opposite direction, and the dog M will be released and allowed to engage the wheel F when the guide reaches the cut-away portion, the arm $p$ of the sector P at the same time engaging the dog L and holding it out of engagement with the wheel E. The wheel E, being loosely mounted on the shaft A, is held against rotation by the dog L, and the annular gear $e$, engaging the radial pinions $d'$, causes the pinions to rotate, which motion is communicated to the wheel F by the annular gear $e$, thereby causing the wheel F to rotate faster than the shaft A and move the sleeve $k$ and nut $h$ in the opposite direction, shutting off steam and reducing the speed. The cut-away portion of the wheel D is sufficiently extended to produce the required variation in speed within the desired time under ordinary circumstances. If, however, the speed should become unusually high or unusually low, an angle-lever, T, pivoted on a stud secured to one of the supports of the rock-shaft R, and adapted to engage the end of the rock-shaft O and be operated by the lever S, slides the rock-shaft O forward or backward, thereby relieving the dog L or M from the guide N, and allowing the dog so relieved to remain in contact with the wheel E or F, as the case may be, until the unusual speed is reduced or the unusual slowness quickened.

If at any time it is desired to hold both the dogs out of contact with the wheels E and F, regardless of the action of the governor, the operating-rod W, attached to the end of the rock-shaft O, may be moved in such a manner as to hold the shaft O against rotation, and thereby prevent the guide N from falling into the cut-away portion of the wheel D.

It will be observed that the mechanism herein described serves to regulate the speed of an engine or water wheel with great delicacy and quickly, and that the load upon the governor proper is only that required to rotate the rock-shaft R a slight distance, which load may be reduced to almost nothing; and it will be further observed that the slightest variation in the governor proper will be sufficient to allow the dog L or M, as required, to engage the wheel E or F and immediately regulate the speed.

In practice the above-described mechanism is capable of actuating any of the cut-off devices for engines or gates of water-wheels.

It is evident that many slight changes may be made in the form and arrangement of the several parts described without departing from the spirit and scope of my invention. For example, the nut $h$ might be stationary and the shaft A caused to slide on the shaft G. I do not, therefore, wish to limit myself strictly to the construction herein set forth, but, Having fully described my invention, what I claim as new, and desire to secure by Letters Patent, is—

1. In speed-governing mechanism, the combination, with a governor proper and a revolving hollow shaft, of a screw-threaded shaft centrally located within the hollow shaft, a screw-threaded nut or sleeve on the central shaft, adapted to rotate with the hollow shaft, connecting mechanism for rotating both shafts simultaneously, and mechanism connecting the governor and central shaft, whereby the latter is automatically locked against rotary movement, substantially as set forth.

2. In speed-governing mechanism, the combination, with a governor proper and a revolving hollow shaft, said shaft being provided with a cam-wheel rigidly secured thereon and a spur-wheel loosely mounted thereon, of a central threaded shaft locked against longitudinal motion within said hollow shaft, and provided with a spur-wheel rigidly secured thereon and a nut movably secured thereon, and mechanism adapted to communicate the motions of the governor-sleeve to the said spur-wheels, and mechanism for communicating the action of the spur-wheels to the central shaft, substantially as set forth.

3. In speed-governing mechanism, the combination, with a governor proper, a revolving hollow shaft provided with a cam-wheel and spur-wheel, the former secured rigidly and the latter mounted loosely thereon, and a central threaded shaft locked against end motion within the hollow shaft, and provided with a spur-wheel secured rigidly thereon and a movable nut secured thereon, of radial pinions mounted in the body of the cam-wheel, adapted to engage the said spur-wheels, and mechanism for communicating the motions of the governor-sleeve to the spur-wheels, substantially as set forth.

4. In speed-governing mechanism, the combination, with a governor proper, a revolving hollow shaft provided with a cam-wheel having radial pinions, and a spur-wheel, and a central threaded shaft locked against end motion within the hollow shaft, and provided with a spur-wheel and movable nut, said spur-wheels being situated in contact with said radial pinions, of spring-pressed dogs adapted to engage the spur-wheels, and mechanism communicating the motions of the governor-sleeve to the dogs, substantially as set forth.

5. In speed-governing mechanism, the combination, with a governor proper, a revolving hollow shaft provided with a cam-wheel carrying radial pinions, and a spur-wheel, a central shaft provided with a spur-wheel and movable nut, said spur-wheels having annular gear in contact with said radial pinions, and a guide adapted to rest against the rim of the cam-wheel, of two spring-pressed dogs bearing against the guide, said dogs being constructed to engage the spur-wheels, and mechanism whereby the motions of the governor-sleeve release either of the dogs or hold both out of engagement, substantially as set forth.

6. In speed-governing mechanism, the combination, with a revolving cam-wheel provided with radial pinions, and two spur-wheels secured on concentric shafts, one on each, each spur-wheel being provided with annular gear in contact with said radial pinions, of mechanism connected with a governor proper, whereby two spring-pressed dogs are caused to engage the said spur-wheels, and thereby control the head of steam or water, substantially as set forth.

7. In speed-governing mechanism, the combination, with a governor proper, a lever operated by the governor-sleeve, and a rock-shaft connected with the said lever and provided with sector-arms, of two spring-pressed dogs adapted to be singly released or both held in suspense by the armed sector, and two spur-wheels secured on concentric shafts, said spur-wheels being operated by a revolving cam-wheel, and adapted to be held in check by the engagement of the dogs, and mechanism whereby the action of the dogs causes an increase or decrease in the head of steam or water, substantially as set forth.

8. In speed-governing mechanism, the combination, with a revolving cam-wheel and two spur-wheels secured on concentric shafts, said spur-wheels being in contact with the cam-wheel, of dogs operated by a governor proper, and an adjustable guide adapted to regulate the contact of the dogs with the spur-wheels, substantially as set forth.

9. In speed-governing-mechanism, a cam-wheel carrying radial pinions mounted in the body of the wheel, constructed in the manner and for the purpose substantially as set forth.

10. In speed-governing mechanism, the combination, with a revolving cam-wheel carrying radial pinions, of two spur-wheels operated by said radial pinions in the manner and for the purpose substantially as set forth.

11. Speed-governing mechanism consisting, essentially, of a revolving hollow shaft provided with a cam-wheel and spur-wheel, the former secured rigidly and the latter loosely thereon, a central shaft provided with a spur-wheel rigidly secured thereon, and with a movable nut, two spring-pressed dogs adapted to engage the said spur-wheels, a guide adapted to regulate the contact of the dogs with the spur-wheels, a governor proper, and mechanism connecting the governor with the dogs, whereby either of the dogs is released or both held in suspense by the motions of the governor-slide, the whole constructed in the manner and for the purpose substantially as set forth.

In testimony whereof I have signed this specification in the presence of two subscribing witnesses.

GEORGE W. ANDERSON.

Witnesses:
M. M. MEWHURNEY,
G. M. KEITH.